United States Patent [19]

Maan

[11] Patent Number: 4,750,826
[45] Date of Patent: Jun. 14, 1988

[54] OPTICAL ASSEMBLY COMPRISING A HOLDER AND AN OPTICAL ELEMENT

[75] Inventor: Nicolaus Maan, Eindhoven, Netherlands

[73] Assignee: U.S. Philips Corporation, New York, N.Y.

[21] Appl. No.: 945,718

[22] Filed: Dec. 23, 1986

[30] Foreign Application Priority Data

Jul. 8, 1986 [NL] Netherlands ............... 8601775

[51] Int. Cl.$^4$ ............... G02B 7/18; G02B 7/02
[52] U.S. Cl. ............... 350/631; 350/287; 350/252; 248/467
[58] Field of Search ............... 350/631, 287, 252, 616, 350/617; 248/467; 372/107

[56] References Cited

U.S. PATENT DOCUMENTS 4,586,787 5/1986 Fiandra et al. ............... 350/252

FOREIGN PATENT DOCUMENTS 3600781 10/1986 Fed. Rep. of Germany ...... 350/252
195811 11/1983 Japan ............... 350/252
69611 4/1985 Japan ............... 350/631

Primary Examiner—Jon W. Henry
Attorney, Agent, or Firm—F. Brice Faller

[57] ABSTRACT

Optical assembly comprising a holder (1) having an inner wall (9) on which a plurality of parallel ribs (11) are formed and an optical element (3) having an outer wall (7), a plurality of gaps (13) being formed between this outer wall and the ribs. The ribs are sufficiently narrow to present a substantially line-shaped contact area to the outer wall. The optical element is connected to the holder by means of an adhesive which is applied exclusively in said gaps.

4 Claims, 2 Drawing Sheets

OPTICAL ASSEMBLY COMPRISING A HOLDER AND AN OPTICAL ELEMENT

BACKGROUND OF THE INVENTION

The invention relates to an optical assembly with an optical axis, comprising a holder with an interior space bounded by an inner wall. An optical element mounted in the holder has an outer wall, an adhesive being applied between the inner wall of the holder and the outer wall of the optical element.

Such optical assemblies are known from EP No. 0090218 (herewith incorporated by reference). The known assemblies each comprise an optical component, such as a round mirror or a lens, and a holder which forms part of an optical apparatus. The holder has a cylindrical bore in which the optical component is mounted, a cylindrical gap being formed between the inner wall of the holder and the outer wall of the optical component in the bore. This gap is wholly or partly filled with an adhesive agent such as a glue.

Optical assemblies are employed in optical apparatus, such as optical disc players, where it is important that the various optical elements are correctly positioned relative to each other. For the manufacturing process it is therefore essential that the optical elements in the optical assemblies are situated at the correct predetermined locations and in the correct position relative to the holder. Important in this respect is the positional accuracy in the direction of the optical axis (Z-direction) of the optical assembly, in the direction of two axes which extend perpendicularly to the optical axis and to each other (X-direction and Y-direction), and in the directions of rotation about the last-mentioned axes.

In one of the assemblies disclosed in EP 0090218 the adhesive is applied in the form of an annular adhesive layer, the layer also adhering to a wall portion of the holder which extends in a plane which is oriented transversely of the optical axis. However, this construction has the disadvantage that as it cures shrinkage of the applied adhesive is inevitable and gives rise to impermissible displacements of the optical component in the Z-direction. Moreover, the likelihood of the optical component being tilted about the X and Y-axes as a result of shrinkage stresses in the adhesive layer is substantial. The above positioning problem can be mitigated to some extent by reducing the thickness of the adhesive layer in the Z-direction but the required strength and stability of the adhesive bond distinctly limit this possibility. A suitable choice of the adhesive may also reduce said problem, but completely eliminating shrinkage and shrinkage stresses is found to be impossible. In another optical assembly disclosed in EP No. 0090218 the adhesive is applied in an annular space between the flat inner wall and outer wall. In yet another assembly the outer wall of the optical component is formed with a circumferential groove, the adhesive extending into this groove. These two assemblies both present the problem that the adhesive, which is applied in the form of a liquid or paste, will flow down after application in said space. This may give rise to at least a local formation of a bead of adhesive on the underside of the optical component, which may lead to positioning errors after curing of the adhesive. Moreover, the behaviour of the adhesive in the fairly large gap between the holder and the optical component is not predictable because generally the gap is not rotationally symmetrical as a result of the positioning of the optical component by means of a tool provided for this purpose, so that circumferentially varying shrinkage stresses may arise in the adhesive causing displacements, in particular tilting, of the optical components relative to the holder.

SUMMARY OF THE INVENTION

It is the object of the invention to improve the construction of the optical assembly of the type defined in the opening paragraph in such a way that the optical assembly can be manufactured in a very accurate and reproducible manner by means of simple tools.

To this end the invention is characterized in that on one of the walls at least three ribs are formed whose crests face the other wall, a numer of gaps equal to the number of ribs being formed between ribs and the other wall, in which gaps the adhesive is applied. In the optical assembly in accordance with the invention the adhesive is situated exclusively in the predetermined narrow gaps at the location of the ribs. Suitably, the ribs extend at least substantially parallel to the optical axis of the assembly. This ensures that shrinkage stresses which arise during curing of the adhesive act only in a plane perpendicular to the optical axis, so that during curing no forces and force differences arise in the direction of the optical axis. This has the advantage that after curing of the adhesive the optical element very accurately occupies the predetermined position and orientation. Moreover, the presence of the ribs enables the adhesive to be applied in the gap between the ribs and the facing wall in accurately determined amounts by syringe-like injection means without the need to contact the optical element.

Optical assemblies in accordance with the invention may comprise optical elements of various types, such as lasers, lenses and mirrors and comply with stringent tolerance requirements.

An embodiment of the invention is characterized in that on the inner wall of the holder at least one locating surface is formed, on which surface the optical element bears. It is to be noted that there is no adhesive between the locating surface and the optical element. In principle, the locating surface only has a function in the manufacture of the assembly, in order to position the optical element, and subsequently to retain this element during application of the adhesive and to facilitate curing of this adhesive.

A further embodiment of the invention, in which the inner wall of the holder is cylindrical and the outer wall of the optical element is annular, is characterized in that the ribs are formed on the inner wall of the holder and are spaced uniformly over the inner circumference of the holder, and in that the holder is provided with a plurality of locating surfaces disposed between the ribs.

By providing a specific clearance between the locating surfaces and the ribs it is ensured that during manufacture of the assembly the adhesive cannot penetrate between the locating surfaces and the optical elements by capillary action. Further, it is to be noted that the adhesive is situated only in the gaps between the ribs and the optical element and, viewed in the Z-direction, is situated only between the crests of the ribs and the bounding edges of the wall facing the ribs, so that during manufacture no beads of adhesive can form. An optical element which is positioned in all directions within tight tolerance limits can be obtained if equal amounts of adhesive are applied in the gaps.

DETAILED DESCRIPTION OF THE PREFERRED EMBODIMENTS

Figure 1:
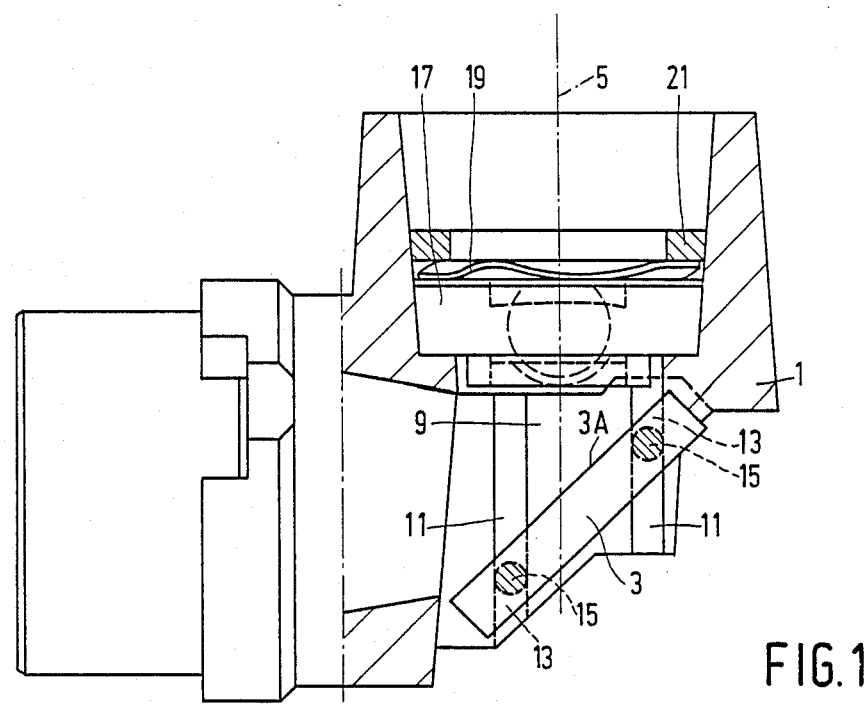
FIG. 1 is a partly sectional view showing the optical assembly in accordance with a first embodiment of the invention.
Figure 2:
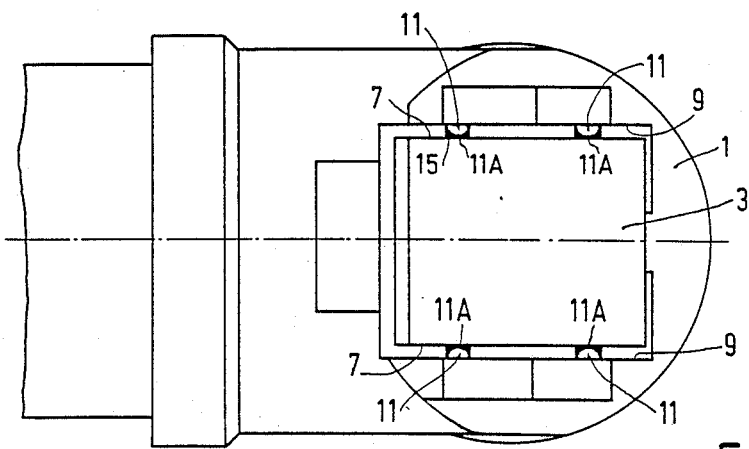
FIG. 2 is an underneath view of the first embodiment.

The optical assembly in accordance with the invention shown in FIGS. 1 and 2 comprises a holder 1 and a rectangular mirror 3 and has an optical axis 5. The assembly is intended for use in the optical system of an optical-disc player. The holder 1 is constructed as a tubular housing having an L-shape, which is provided with a window at the location of the elbow. The mirror 3, which has the form of a plane-parallel plate, is secured in the holder 1 in such a way that the optical axis 5 extends at an angle of 45° to the reflecting surface 3A of the mirror 3. On both sides the mirror 3 has a plane outer wall 7 facing a flat inner wall 9 of the holder 1. Two ribs 11 are formed on the inner wall 9 on each side of the mirror 3, which ribs extend parallel to the optical axis 5 of the optical assembly. The ribs 11 have crests 1A facing the outer wall 7 of the mirror 3, narrow gaps 13 being formed between the ribs 11 and the outer wall 7, in which gaps an amount of an adhesive 15, such as a UV curable acrylate resin, is applied. The adhesive is situated exclusively in the gaps 13. Experiments have shown that by means of this method of securing the mirror optical assemblies whose mirrors are positioned within very tight tolerance limits can be manufactured in series. The assembly further comprises a lens with a grating 17 which is secured in the holder 1 by means of a blade spring 19 and a retaining ring 21, which is glued in place.

Figure 3:
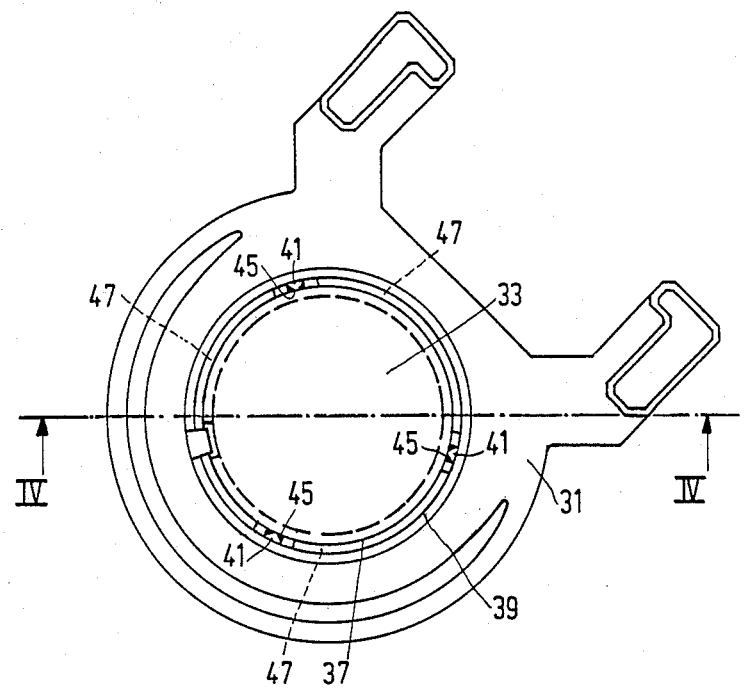
FIG. 3 is a plan view of a second embodiment.
Figure 4:
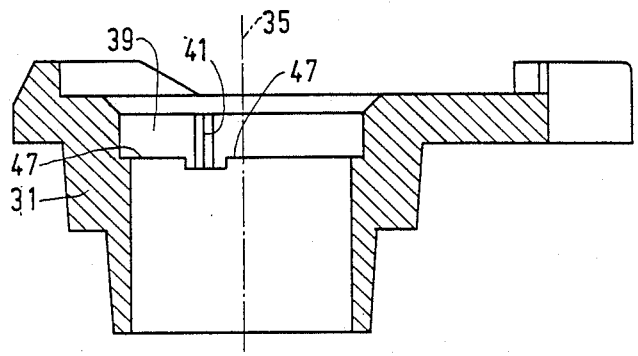
FIG. 4 is a sectional view, taken on the line IV—IV, of the second embodiment without the optical element.

FIGS. 3 and 4 show an optical assembly in accordance with the invention comprising an annular holder 31 and a laser 33 and having an optical axis 35. The holder has a cylindrical inner wall 39 which bounds a central aperture in the holder 31 in which the laser 33 is mounted. The laser 33 has an annular outer wall 37 which is spaced at some distance from the inner wall 39 of the holder 31, which concentrically surrounds it. The holder is provided with three ribs 41 which extend parallel to the optical axis 35 and which are equidistantly spaced from one another. Between the ribs 41 and the outer wall 37 gaps are formed in which an adhesive 45 is applied in a manner as already described for the assembly shown in FIGS. 1 and 2. Between the ribs 41 inside the holder 1 three locating surfaces 47 are formed. The locating surfaces 47 are situated at some distance from the ribs 41 and extend in a plane which is intersected perpendicularly by the optical axis 35. A mounting face, not shown, of the laser 33 engages with the locating surfaces 47.

What is claimed is:

1. An optical assembly with an optical axis, comprising a holder with an interior space bounded by an inner wall and an optical element mounted in said holder and having an outer wall, an adhesive being applied between the inner wall of the holder and the outer wall of the optical element, characterized in that on one of the walls at least three ribs are formed whose crests face the other wall, said ribs extending at least substantially parallel to the optical axis of the assembly, each of said ribs having a width substantially narrower than its length so that each rib presents a substantially line-shaped contact area to said other wall, a number of gaps equal to the number of ribs being formed between ribs and the other wall, in which gaps the adhesive is applied.

2. An optical assembly as claimed in claim 1, characterized in that on the inner wall of the holder at least one locating surface is formed, on which surface the optical element bears.

3. An optical assembly as claimed in claim 1, the inner wall of the holder being cylindrical and the outer wall of the optical element being annular, characterized in that the ribs are formed on the inner wall of the holder and are spaced uniformly over the inner circumference of the holder, and in that the holder is provided with a plurality of locating surfaces disposed between the ribs.

4. An optical assembly as in claim 1 wherein equal amounts of adhesive are applied in each of said gaps.

* * * * *